United States Patent [19]
Butin et al.

[11] 3,849,241

[45] Nov. 19, 1974

[54] NON-WOVEN MATS BY MELT BLOWING

[75] Inventors: Robert R. Butin; James P. Keller; John W. Harding, all of Baytown, Tex.

[73] Assignee: Exxon Research and Engineering Company

[22] Filed: Feb. 22, 1972

[21] Appl. No.: 227,769

Related U.S. Application Data

[63] Continuation-in-part of Ser. Nos. 865,105, Oct. 9, 1969, Pat. No. 3,755,527, and Ser. No. 103,050, Dec. 31, 1970, abandoned, and Ser. No. 103,094, Dec. 31, 1970, abandoned, said Ser. No. 103,050, and Ser. No. 103,094, each is a continuation-in-part of Ser. No. 786,122, Dec. 23, 1968, abandoned.

[52] U.S. Cl. ............ 161/169, 156/167, 264/176 F, 264/210 F, 264/211
[51] Int. Cl. ............................................. F06b 9/30
[58] Field of Search ............ 264/210 F, 176 F, 121; 156/167, 181, 62.4, 229, 244; 161/169, 402; 425/71

[56] References Cited
UNITED STATES PATENTS

| 3,013,003 | 12/1961 | Maragliano et al. | 260/93.7 |
| 3,143,584 | 8/1964 | Roberts et al. | 264/210 F |
| 3,502,763 | 3/1970 | Hartmann | 264/210 F |
| 3,543,332 | 12/1970 | Wagner et al. | 264/176 F |
| 3,551,943 | 1/1971 | Staton et al. | 18/2 |
| 3,595,245 | 7/1971 | Buntin et al. | 131/269 |
| 3,615,995 | 10/1971 | Buntin et al. | 156/161 |
| 3,615,998 | 10/1971 | Kolb et al. | 156/167 |
| 3,634,573 | 1/1972 | Wagner et al. | 264/210 F |
| 3,676,242 | 7/1972 | Prentice | 156/297 |
| 3,755,527 | 8/1973 | Keller et al. | 264/176 F |

OTHER PUBLICATIONS

"Superfine thermoplastic Fibers," by Wente, Ind. Eng. Chem., Vol. 8, No. 8, pp. 1342–1346, Aug. 1956, Pat. Off. Sci. Lib.

*Primary Examiner*—Jay H. Woo
*Attorney, Agent, or Firm*—Timothy L. Burgess; David A. Roth

[57] ABSTRACT

Melt blown non-woven mats prepared from thermoplastic polymer fibers and substantially completely free of polymer shot are produced at high polymer throughput rates in an improved melt blowing process in which thermoplastic polymer resins, preferably polypropylene, having initial intrinsic viscosities of at least 1.4, are degraded, optionally in the presence of a free radical source compound, to have both reduced intrinsic viscosities and an apparent viscosity in the melt-blowing nozzle orifices of from about 50 to about 300 poise.

37 Claims, 4 Drawing Figures

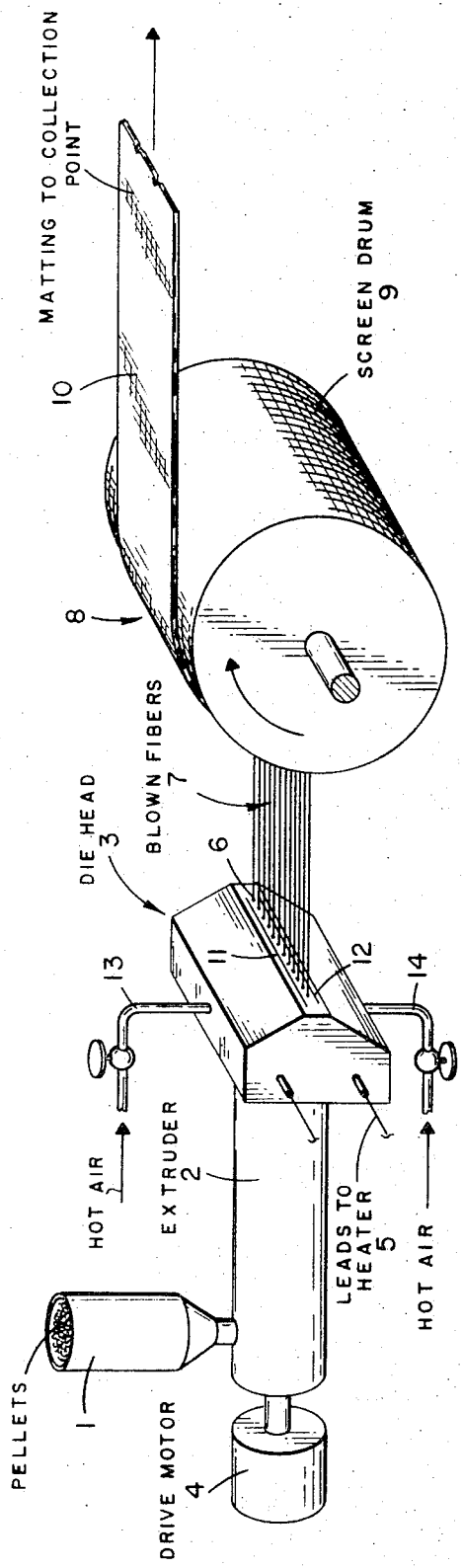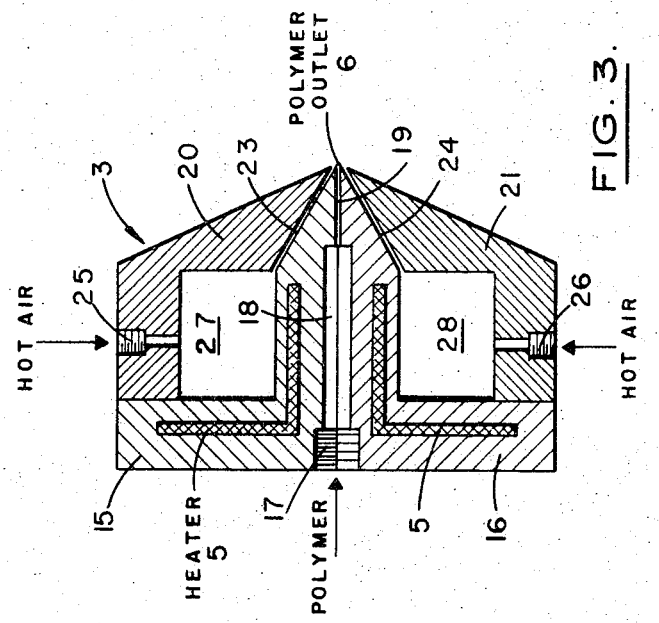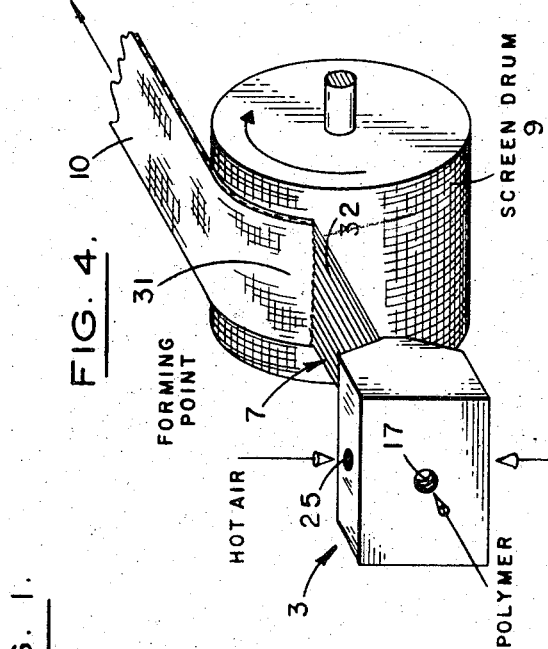

NON-WOVEN MATS BY MELT BLOWING

CROSS REFERENCE TO RELATED APPLICATION

This is a continuation-in-part of Ser. No. 865,105 filed Oct. 9, 1969 and now U.S. Pat. No. 3,755,527 and entitled "Melt Blown Non-Woven Synthetic Polymer Mat Having High Tear Resistance," and also Ser. Nos. 103,050 and now abandoned and 103,094 and now abandoned, each filed on Dec. 31, 1970, and entitled "Non-Woven Mats by Melt Blowing," each of Ser. Nos. 103,050 and 103,094 in turn being a continuation-in-part application of Ser. No. 786,122 filed Dec. 23, 1968, and now abandoned, entitled "Non-Woven Polypropylene Mat by Melt Blowing."

BACKGROUND OF THE INVENTION

This invention relates to melt-blowing processes for producing non-woven mats. More particularly, it relates to processes in which a fiber-forming thermoplastic polymer resin is extruded in molten form through orifices of a heated nozzle into a stream of hot gas to attenuate the molten resin as fibers which form a fiber stream, the fibers being collected on a receiver in the path of the fiber stream to form the non-woven mat.

Various melt-blowing processes of the foregoing description have been described heretofore, earlier efforts including those of Hall (U.S. Pat. No. 2,374,540), Manning (U.S. Pat. No. 2,411,659; U.S. Pat. No. 2,411,660; and U.S. Pat. No. 2,437,263) and Marshall (U.S. Pat. No. 2,508,462). A melt-blowing process is disclosed in the article "Super-Fine Thermoplastics," by Van A. Wente, in Industrial and Engineering Chemistry, Volume 48, No. 8 (1956), pages 1,342–1,346 and also in Naval Research Laboratory Report No. 111437, submitted Apr. 15, 1954, entitled "Manufacture of Super-Fine Organic Fibers." The Naval Research Laboratory process is further described in NRL Report 5265, dated Feb. 11, 1959, and entitled "An Improved Device for the Formation of Super-Fine, Thermoplastic Fibers." U.S. Pat. No. 3,532,800 to Wyly et al discloses a use of the Naval Research Laboratory melt-blowing process. A melt spinning and blowing process is disclosed in British Pat. No. 1,055,187 and U.S. Pat. Nos. 3,379,811 and 3,502,763. As evidenced by these prior melt-blowing processes, it has been believed and taught that degradation of a fiber-forming thermoplastic polymer resin is to be avoided in a melt-blowing process.

Heretofore, non-woven mats made of essentially discontinuous fibers and produced by known melt-blowing processes have contained undesirable coarse "shot" or "beads" of material larger than about 0.3 millimeter in diameter. Moreover, prior melt-blowing processes operate at low and generally uneconomical resin flow rates of less than 1.0 gram per minute per resin outlet and experience difficulty in producing soft, fine, high quality mats that do not contain coarse shot. Also, earlier melt-blowing processes do not disclose how to produce mats substantially free of coarse shot from a fiber-forming thermoplastic polymer resin having a high intrinsic viscosity (1.4 or greater), particularly with $C_3$–$C_8$ polyolefins, especially polypropylene. These polyolefins, which are conventionally produced in the presence of a heterogeneous solid catalyst, normally have very high intrinsic viscosities typically 2.2 to 4 and higher, corresponding to high viscosity average molecular weights of about 270,000 to about 550,000 and higher. Intrinsic viscosities as used herein are measured in decalin at 135° C. The melt flow rates or melt indexes of these high intrinsic viscosity resins are quite low, typically about 5 to 0.5 and lower.

SUMMARY OF THE INVENTION

Non-woven mats prepared from thermoplastic polymer fibers are produced at unusually high polymer resin throughput rates with no adverse affects on mat quality, for example, without having coarse shot greater than 0.3 millimeter in diameter in the mat, by an outstandingly improved melt-blowing process which this invention comprises. This improved process involves controlling within critical ranges the interrelationships of the parameters of polymer resin flow rate, polymer apparent viscosity, process temperatures, and gas flow rates. Polypropylene is a preferred polymer.

DESCRIPTION OF THE INVENTION

The present invention is an improvement in melt-blowing processes for producing non-woven mats in which a fiber-forming thermoplastic polymer resin is extruded in molten form through orifices of a heated nozzle into a stream of a hot inert gas to attenuate the molten resin as fibers which are then collected on a receiver to form the non-woven mat.

It has been discovered that the production of high quality non-woven mats of thermoplastic polymer fibers requires a prior degradation of the fiber-forming thermoplastic polymer resin so that the degraded resin, during extrusion through the resin orifices in the nozzle of the melt-blowing apparatus, has an apparent viscosity of from about 50 to about 300 poise, measured at a shear rate of from about 700 to about 3,500 $sec^{-1}$.

It has been particularly discovered that fiber-forming thermoplastic polymer resins which, as made, have high intrinsic viscosities (at least about 1.4) and low melt flow rates (at most about 55), can be employed in melt-blowing processes to produce melt-blown non-woven mats of high quality, particularly non-woven mats which are substantially completely free of coarse shot having a diameter greater than 0.3 millimeter. To use such high intrinsic viscosity, low melt flow rate thermoplastics for this purpose, it is first necessary, before extruding the resin from the nozzle orifices, to subject the thermoplastic polymer resin to a critically controlled degradation, optionally promoted by a free radical source compound, until the thermoplastic polymer resin has both a reduced intrinsic viscosity of from about 0.6 to less than about 1.4, preferably within the range from about 0.8 to about 1.3, advantageously from about 0.9 to about 1.2, and also an apparent viscosity in the nozzle orifices during extrusion of from about 50 to about 300 poise, preferably at least 100 poise, advantageously from about 100 to 200 poise, measured at a shear rate of from about 700 to about 3,500 $sec^{-1}$.

This controlled prior degradation of initially high intrinsic viscosity fiber-forming thermoplastic polymer resins permits the production of new melt-blown non-woven mats of high quality which are of two types. One melt-blown non-woven mat is comprised of essentially continuous fibers having diameters in the range from about 8 to about 400, preferably from about 8 to about 50 microns, and is substantially completely free of shot, both coarse and fine. The other type of melt-blown non-woven mat is comprised of discontinuous fibers having diameters in the range from about 0.5 to about 5 microns, preferably from about 0.5 to about 2 microns, and contains only very fine shot, less than 0.3 millimeter in diameter. Both types of these non-woven mats that are substantially completely free of coarse shot have less than about 1 weight percent, preferably less than 0.5 weight percent of shot having diameters larger than 0.3 millimeter. The latter type of mat may contain from about 5 about 25 weight percent of shot with diameters in the range of about 0.2 to about 0.1 millimeter, less of such shot being acceptable as shot size increases. Preferably shot size is less than 0.1 millimeter. (Shot size refers to shot in the as made form, prior to any calendering or compression thereof which tends to flatten the shot and increase its diameter.) The intrinsic viscosity of the fibers in these mats is in the range from about 0.6 to less than about 1.4.

Successful production of these high quality mats involves careful selection of special process conditions and a correlation of the apparent viscosity of the degraded resin with the resin flow rates of the degraded resin and with gas flow rates, which occur both in a low gas flow rate regime of from about 2.5 to about 20 pounds per minute per square inch of gas outlet area and in a high gas flow rate regime of from more than 20 to about 100 pounds per minute per square inch of gas outlet area. The selection and correlation of these special process conditions is described hereinafter in greater detail. It is appropriate first, however, to describe in greater detail the process of degrading the initially high intrinsic viscosity fiber-forming thermoplastic resins employed in the subject process.

There are a few general approaches to bring about the extent of polymer degradation requisite to the practice of this invention. Temperatures well above the melting point of the polymer are employed. In the absence of free radical source compounds, which promote oxidative degradation, the high intrinsic viscosity resin suitably is subjected to a temperature within the range from about 550° F. to about 900° F., preferably from about 600° F. to about 750° F., for a period of time effective to cause the requisite extent of resin degradation, typically from about 1 to about 10 minutes, preferably from 2 to about 6 minutes. No effort is made to exclude oxygen from the thermal degradation reaction. Accordingly, both thermal and oxidative degradation occur in such temperature ranges, oxidative degradation being predominate at temperatures below about 650° F., and thermal degradation becoming predominate above about 650° F. (The activation energy for autooxidative degradation is reported to be from about 26 to about 33 Kcal/mol; for thermal degradation it is reported to be from about 50 to about 65 Kcal/mol; for a combined thermal and oxidative process, it is calculated to be about 33 Kcal/mol. Thus, at 550° F., the percent of the total degradation reaction attributable to autooxidation is about 90 percent; at 600° F., it is about 75 percent, and at 650° F., it is about 55 percent.) Thus, herein, oxidative degradation will be understood to be occurring, particularly at the lower temperatures in the aforesaid temperature ranges, whenever thermal degradation is mentioned. Lower temperatures of from about 475° F. to about 650° F. are suitably employed to bring about degradation when oxidative degradation is promoted by the presence of one or more free radical source compounds.

Suitable free radical source compounds include organic peroxides, thiyl compounds (including thiazoles and thiurams, thiobisphenols and thiophosphites) and organo-tin compounds. Preferred free radical source compounds include t-butylbenzoate, dicumylperoxide, 2,5-dimethyl-2,5-di-tert-butylperoxy3-hexene (Lupersol 130), $\alpha, \alpha'$-bis(tert-butylperoxy) diisopropyl benzene (Vul Cup R), or any other free radical source compounds having a 10-hour half life temperature over 80° C., or mixtures thereof. In general, the higher the decomposition temperature of the free radical source compound, the better. Reference is made to pp 66–67 of Modern Plastics, November 1971, for a more complete list of suitable such compounds. Sulphur compounds which give rise to suitable thiyl compounds are disclosed in U.S. Pat. No. 3,143,584. Suitably such free radical source compounds are used at concentration in the range from about 0.01 to about 5 weight percent, preferably from about 0.1 to about 3 weight percent.

The thermoplastic polymer resin having the high initial intrinsic viscosity of at least 1.4 is preferably thermally and/or oxidatively degraded either in an extruder separate from the melt-blowing apparatus or in an extruder feeding the resin into the nozzle orifices of the melt-blowing apparatus. Alternatively, the requisite extent of degradation may be imparted to the resin by thermal degradation of the resin in the heated nozzle. Preferably, however, the requisite extent of degradation is imparted to the resin at least partially in the extruder feeding the resin into the nozzle orifices.

The degraded fiber-forming thermoplastic polymer resin used in the present melt-blowing process preferably is produced, in one or more degradation treatments, from fiber-forming thermoplastic polymer resins that are degradable to have an apparent viscosity in the nozzle orifices of from about 50 to about 500 poise, including polyamides, e.g., poly(hexamethylene adipamide), poly($\omega$-caproamide) and poly(hexamethylene sebacamide); polyesters, e.g., poly(methymethacrylate) and poly(ethyleneterephthalate): polyvinyls, e.g., polystyrene; $C_3$–$C_8$ polyolefins, high density polyethylene, and mixtures thereof. Preferably the fiberforming thermoplastic polymer, as made, has an intrinsic viscosity of at least about 1.4, most preferably about 2.5 and greater. Supported metal oxide or Ziegler transition metal halide catalyzed olefin polymers, especially the $C_3$–$C_8$ polyolefins having initial minimum intrinsic viscosities of 1.4 and greater, are preferred, particularly fiber-forming polypropylene.

In accordance with this invention, commercially useful resin throughput rates can be utilized. Suitable resin throughput (flow) rates range from nominally about 0.1 (e.g. as low as about 0.07) to about 5 grams per minute per nozzle orifice, preferably at least about 1 gram per minute per orifice.

In the melt-blowing process of the present invention, the degraded fiber-forming thermoplastic polymer resin is attenuated while still molten to fibers having diameters of 0.5 to 400 microns. The diameter of the attenuated fibers will decrease as the gas flow rate through the gas outlets or slots on either side of the nozzle die openings increase. Gas rates may vary from 2.5 to 100 pounds per minute per square inch of gas outlet area, or greater. At low to moderate gas rates of from about 2.5 to about 20 pounds per minute per square inch of gas outlet area for resin flow rates of from about 0.1 to about 5 grams per minute per orifice, the fibers are essentially continuous with little or no fiber breaks. Fibers produced in this low to moderate gas flow rate regime have diameters of from about 8 to about 200–400 microns, preferably from about 8 to about 50 microns.

As gas rates increase for a selected resin flow rate of a degraded resin, the number of fiber breaks increase, producing coarse "shot," which is large globs of polymer having a diameter at least several times that of the average diameter size of the fibers in the mat and at least 0.3 millimeter in diameter. The production of coarse shot is objectionable in the mat when a uniform mat is desired. Further, if the mat is calendered or further treated, the coarse shot will produce imperfections in the surface or even holes.

At high gas rates of from about more than 20 to about 100 pounds per minute per square inch of gas outlet area, the mats are composed of non-continuous polymer fibers with the presence of a fine shot less than 0.3 millimeter, preferably 0.1 millimeter in diameter, which is not objectionable in the mat. At the high air rates for resin flow rates in the range from about 0.1 to about 5 grams per minute per orifice, mats are produced in which the fiber size is between about 0.5 and 5 microns.

The resin flow rate, gas flow rate and the apparent viscosity of the degraded resin are controlled and correlated, in accordance with the invention, to provide increased production of melt-blown non-woven mats while preventing the inclusion as aforesaid of coarse shot in the mats. These correlations make use of interrelationships which exist between the resin flow rate, gas flow rate and apparent viscosity of the degraded resin in both the high and low gas flow rate regimes. These interrelationships are illustrated in Table I which follows.

and gas flow rate in the aforementioned range are chosen as the fixed combination of variables, in the low gas flow rate regime, the resin is degraded to have a selected apparent viscosity in said range from 50 to 300 poise that does not exceed a minimum apparent viscosity below which coarse shot is formed. Similarly in Group 1, for the high flow rate regime, the resin is degraded to a selected apparent viscosity in the range from 50 to 300 poise that does not exceed a maximum apparent viscosity above which, for the chosen combination of resin flow rate and gas flow rate, coarse shot is formed.

If it is wished to increase or decrease in the values of one of the variables in the chosen combination, an adjustment may need to be made in the third variable to prevent the formation of coarse shot. For example, in the first case in which resin flow rate and gas flow rate are the chosen combination, if the gas flow rate is increased or the resin flow rate is decreased, the minimum apparent viscosity selected for the degraded resin must be increased in the low gas flow rate regime to prevent the inclusion of coarse shot in the resultant nonwoven mat. However, no limiting adjustment is necessary in the apparent viscosity to prevent the inclusion of coarse shot in the mat in the low gas flow rate regime if the gas flow rate is decreased or the polymer rate is increased; in this situation, the result in the low gas flow rate regime will be thicker, coaser fibers. In the high gas flow rate regime, a decrease in the gas flow rate or an increase in the resin flow rate requires a decrease in the maximum apparent viscosity of the degraded resin in order to prevent the inclusion of coarse shot in the non-woven mat. However, no limiting adjustment in apparent viscosity is necessary to prevent the inclusion of large shot in high gas flow rate regime

TABLE I

Interrelationships of Resin Flow Rate (RFR), Gas Flow Rate (GFR) and Apparent Viscosity (A.V.) of Degraded Resin in High and Low GFR Regimes

| | | | Third | Third Variable Limiting Adjustment: | |
|---|---|---|---|---|---|
| A. | Chosen Combination of Two Variables | | Variable | Low GFR Regime | High GFR Regime |
| | 1. RFR, GFR | | A.V. | Minimum | Maximum |
| | 2. RFR., A.V. | | GFR | Maximum | Minimum |
| | 3. GFR, A.V. | | RFR | Minimum | Maximum |
| B. | | Fixed Changed | | | |
| | 1. | RFR GFR (increase | A.V. | (increase | (— |
| | | (decrease | | (— | (decrease |
| | | GFR RFR (increase | A.V. | (— | (decrease |
| | | (decrease | | (increase | (— |
| | 2. | RFR A.V. (increase | GFR | (— | (increase |
| | | (decrease | | (decrease | (— |
| | | A.V. RFR (increase | GFR | (— | (increase |
| | | (decrease | | (decrease | (— |
| | 3. | GFR A.V. (increase | RFR | (— | (decrease |
| | | (decrease | | (increase | (— |
| | | A.V. GFR (increase | RFR | (increase | (— |
| | | (decrease | | (— | (decrease |

Table I shows that there are three basic groupings of the variables. For a particular combination for values for two variables which it is chosen to fix, the third variable has, in the low and high gas flow rate regimes, either a minimum value below which, or a maximum value above which, coarse shot will be formed. Thus, referring to Group 1, where a particular resin flow rate if gas flow rate is increased or resin flow rate is decreased; in this situation the fibers in the non-woven mats generally have smaller diameters.

The foregoing interrelationships will be further understood by the description of the preferred embodiment and modes of the invention taken with the examples.

BRIEF DESCRIPTION OF THE DRAWINGS

FIG. 1 is a schematic view of the overall melt-blowing process;

FIG. 3 is a cross-sectional view of the nozzlie die; and

FIG. 4 is a view of the lay-down of melt-blown fibers on a pick-up device.

DESCRIPTION OF THE PREFERRED EMBODIMENT

Figure 2:
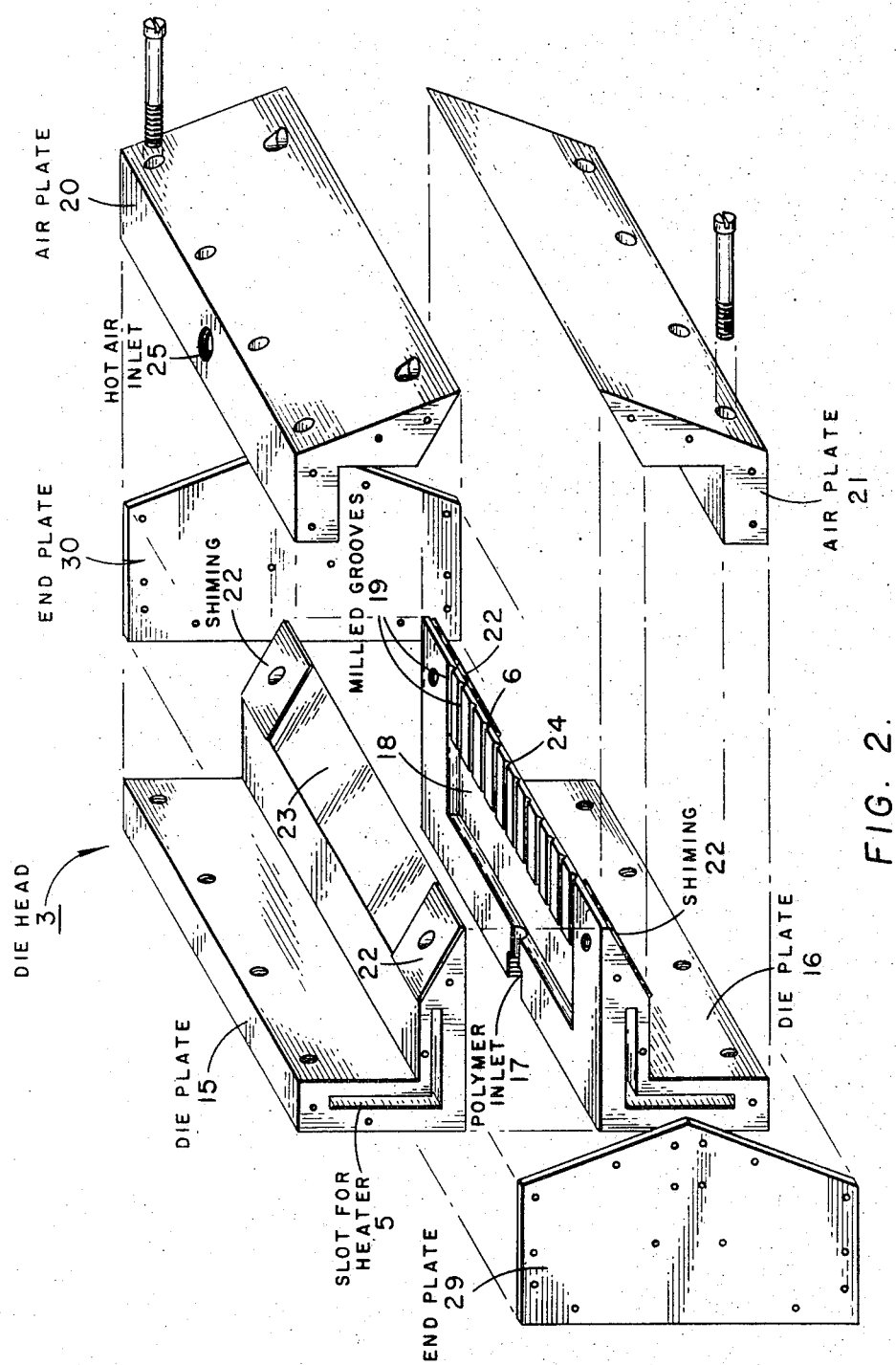
FIG. 2 is a detailed exploded oblique view of a nozzle die which may be used in the melt-blowing process.

Referring to FIG. 1 of the drawings, a fiber-forming thermoplastic polymer resin having an intrinsic viscosity of at least about 1.4, preferably a $C_3$ to $C_8$ polyolefin, e.g., poly propylene, is introduced into a pellet hopper 1 of an extruder 2. The resin used in the present invention has either been thermally degraded before being introduced into the extruder 2 or is thermally degraded in the extruder 2 and/or die head 3 with or without the use of free radical source compounds. According to the present invention, the resin is added into the hopper 1 and then is heated in the extruder 2 at temperatures in excess of about 550° F. and preferably within the range of 600° to 800° F. The degree of thermal degradation necessary varies since the viscosity average molecular weight of the resin will vary in conventional production of various resins having intrinsic viscosities of at least 1.4, and further since the degree of thermal degradation will depend on the resin flow rates used in the melt-blowing process. Particularly in the instances of polyolefins produced in a Ziegler catalyzed process, it has been found that a requisite degree of thermal degradation is necessary before it can be utilized in the melt-blown process of the present invention. The fiber-forming resin is forced through the extruder 2 by a drive 4 into the nozzle die head 3. The nozzle die head 3 may contain a heating plate 5 which may also be used in the thermal degradation of the resin before it is melt-blown. Thus, a partial thermal degradation of the resin may be carried out in extruder 2 and a final thermal degradation may be performed in the nozzle die head 3. The resin is then forced out of a row of nozzle orifices or die openings 6 in the nozzle die head 3 as molten strands into a gas stream which attenuates the molten strands into fibers 7 which are collected on a moving collecting device 8 such as a drum 9 to form a continuous mat 10. The gas stream which attenuates the extruded molten resin is supplied through gas outlet slots 11 and 12, respectively. These gas slots 11 and 12 are supplied with a hot inert gas, preferably air, by gas lines 13 and 14, respectively. The term "inert" in respect to the hot gas is used to mean a gas which is no more reactive with the extruded molten resin at the gas temperatures described herein than air is at such temperatures. The examples disclosed herein use air as a gas.

The air temperatures may vary from 500° to 900° F. Generally the air temperatures are within the same temperature range as the nozzle die temperatures. Usually the air temperatures are slightly higher, about 50° F., than nozzle die temperatures.

The process may be further understood by considering the details of the nozzle die head 3 which is more fully set forth in FIGS. 2 and 3. The complement parts of the die head 3 are shown in FIG. 2 in the exploded view. The nozzle die head 3 is made up of upper die plate 15 and a lower die plate 16.

The fiber-forming resin, preferably polypropylene, is introduced into the back of the die plates 15 and 16 through an inlet 17. The resin then goes into a chamber 18 between the upper and lower die plates 15 and 16, respectively. The facing of the die plate 16 has milled grooves 19 which terminate in the nozzle die openings or orifices 6. It is understood, of course, that the milled grooves may be in the lower die plate 16, in the upper die plate 15, or grooves may be milled in both plates 15 and 16. Alternatively orifices may be drilled in a single plate. An upper gas cover plate 20 and a lower gas cover plate 21 are connected to the upper die plate and lower die plate 15 and 16, respectively. The hot gas is supplied by inlets 25 and upper air plate 20 and lower inlet 26 in lower gas plate 21. Suitable baffling means (not shown) may be provided in both the upper gas chamber 27 and lower gas chamber 28 to provide a uniform flow of gas through the gas slots 23 and 25, respectively. End plates 29 and 30 make up the remainder of the nozzle die head 3. As shown in FIG. 3, the rear portion of the die head 3 may contain heating means 5 for heating both the polymer and air in the nozzle die head 3.

In FIG. 4 the laydown of the attenuated fibers 7 on the drum 9 is shown in more detail. The fibers are blown from the nozzle die head 3 and are laid down on the screen covering drum 9 which preferably is positioned from 1 to 30 inches from the nozzle orifices 6 in the nozzle die head 3. Mats produced when the screen is at a distance of 1¼ to 2 inches differ in compactness and appearance from those produced at a distance of 5 to 8 inches or those collected at greater than 12 inches. Also illustrated in FIG. 4 is the production of "shot" 31 which may be produced in the mat 10. "Shot" is a mass or glob of polymer which appears to be the result of individual fibers breaking, such a fiber break illustrated at 32 which because of its attenuation is forced into the mat 10 as a glob with a diameter many times the average diameter of the fiber.

The production of "shot" is related to gas flow rates at any given resin flow rate for a degraded resin apparent viscosity. Also, in making a uniform web, it is desired to eliminate the formation of "rope." "Rope" occurs when the gas flow rates from the two slots 11 and 12 are out of adjustment such that the attenuated fibers come in contact one with the other and are not blown away from the nozzle die head as individual fibers but come in contact and are laid down as collected aggregates. Insufficient gas flow rates for the resin flow rate or having the gas flow rates from the upper or lower gas slots out of adjustment will produce "rope" in a nonwoven mat. "Rope" can also be formed at long nozzle die heat-to-collecting device distances (2 to 3 feet) where the fibers are entangled due to the turbulence of the air jet. The presence of both "rope" and coarse "shot" will make a non-woven material unacceptable for many uses because of adverse effect on appearance and on strength properties.

As the gas flow rates for a fixed resin flow rate are increased sufficiently so that "rope" is not formed, mats are formed from essentially continuous fibers, and have essentially no coarse "shot," i.e., less than about 1 weight percent shot. This occurs at gas flow rates in the range from about 2.5 to about 20 pounds per minute per square inch of total slot area. With increasing gas flow rates for the fixed polymer rate and apparent viscosity, a maximum gas flow rate is exceeded and coarse "shot" is produced having diameters greater than 0.3 millimeter. As the gas flow rates increase even further, in the range of from more than 20 to about 100 pounds per minute per square inch of total slot area, the "shot" becomes smaller and often elongated and appears as very fine "shot" at high gas flow rates. "Shot" is coarse and unacceptable when the masses or globs of polymer are relatively large (greater than 0.3 millimeter in diameter) and can be seen with the eye or when the web is calendered as an imperfection or fused spot.

The level of thermal treatment appropriate to impart the requite extent of thermal degradation to the feed resin, in the extruder 2 for a set nozzle die temperature and a set resin flow rate is readily determined. The nozzle die tip temperature is set in the range from abut 500° F. to 900° F., preferably 500° F. to 750° F., and the resin flow rate is set from about 0.1 to about 5 grams per minute per nozzle orifice. Then the air flow is fixed at a rate which is in the range of from more than 20 to about 100 pounds per minute per square inch of the total air slot area (sonic velocity levels). The mat is observed as zones of the extruder are heated. At too low a temperature in the extruder 2 the mat contains many large blobs of polymer and/or coarse ropey material. As the temperature is increased, the apparent viscosity of the degraded resin exceeds the minimum for the chosen resin flow rate and air flow rate and the mat becomes finer fibered, softer, and has less and smaller shot of diameter smaller than 0.3 millimeter. When the temperature is too high, the mat becomes extremely soft and fluffy, but the air blast from the die causes extreme fiber breakage and many short fibers to be blown from the mat into the air, away from the laydown zone. The mats produced in the appropriate thermal degradation range are very white, opaque, and soft. The fibers are between abut 0.5 and 5 microns diameter, diameter, usually between about 1.5 and 4 microns in diameter.

As an alternative procedure, the temperature of the extruder 2 can be fixed, and the appropriate extent of thermal degradation can be obtained by raising the nozzle die temperature until it is in the correct range to produce the fine fibers and acceptably small fine shot, without extreme fiber breakage.

The best conditions for a fine fibered, soft web are obtained at a thermal treating temperature which is just below the temperature where fine fibers escape from the laydown zone with the air stream. The best thermal treating temperature for obtaining the highest strength fibers is the lowest temperature at which the shot is unobjectionable. The exact treating temperatures required to obtain good fine fibered webs is dependent upon the starting resin and the rate of throughput of the resin in the extruder. For example, a 5 melt flow rate (2.23 intrinsic viscosity) resin may require temperatures in the range of 650°–700° F. while an 0.5 melt flow rate (3.49 intrinsic viscosity) resin may require temperatures of 700°–760° F. or higher. Thermal treatment of the resin, say to intrinsic viscosities of from about 1.30 to 1.25, prior to feeding the resin through the extruder 2 can lower the required temperatures in the extruder 2 and/or the nozzle die head 3.

Another indication that the thermal treatment is adequate is the resin pressure (resin pressure head in the nozzle orifices) for the resin flow rate in the nozzle die head 3. When the resin is correctly thermally treated in the extruder, the resin pressure lies in a small range independent of the melt flow rate or intrinsic viscosity of the starting resin or of the nozzle die temperature. In the terms of the particular geometry of the nozzle die holes 6, by measuring the pressure upstream of the nozzle die holes for the flow rate of the particular resin and by calculating the apparent viscosity of the degraded resin in the nozzle die holes 6 according to methods well known in polymer rheology [see, e.g., H. V. Boenig, Polyolefins, p. 264 (1966) and Chemical Engineering Handbook (Perry ed. 1950), p. 375], thermal treatment produces an apparent viscosity in the nozzle die holes 6 of from about 50 to about 300 poise, preferably at least 100 poise, an especially preferred range being from about 100 to about 200 poise.

With the appropriate level of thermal treatment determined as described immediately above for the particular starting resin and resin flow rate, the air flow rate is suitably decreased to the low air flow rate regime (from about 2.5 to about 20 pounds per minute per square inch of total air slot area) for the production of non-woven mats in the low air flow rate regime from the appropriately thermally degraded fiber-forming resin.

Non-woven mats produced in the low air flow rate regime consist essentially of continuous fibers whose morphology as seen by a polarizing microscope is non-oriented. If the fiber cools slowly, a large spherulitic structure can form and the fibers are stiff and brittle. With more rapid cooling, the fibers are non-spherulitic, flexible, and have a high elongation to break. The cooling rate increases with decreasing fiber size and increased die nozzle to collector distance. The table below shows upper limits of air flow rates for various polymer rates from about 0.1 to about 0.3 grams per minute per orifice for various nozzle die temperatures. As the gas (air) rate was increased, the fibers were observed with a stroboscopic light at about 600 cycles per minute to observe visually when breakage started. The maximum air flow rate just below the breakage point is recorded.

| | |
|---|---|
| Die Nozzle | 4-inch row of 80 resin extrusion orifices, each orifice .022 inch diameter, .050 inches between orifice centers. |
| Air Slots | 4 inches long above and below the row of nozzle orifices, the slot opening being varied as shown in the table. |
| Resin | Polypropylene, partially thermally degraded to a melt flow rate of 33 (1.55 intrinsic viscosity). |
| Extruder Temperature | Constant at 500° F. |

| Run | Nozzle Die Temp. °F. | Resin Flow Rate (gm/min/orifice) | Air Slot Height (inches) | Air Velocity (ft/sec) | Air Rate lb/min/in² of Total Slot Area |
|---|---|---|---|---|---|
| 1 | 582 | 0.089 | .012 | 293 | 4.5 |
| 2 | 579 | 0.091 | .020 | 256 | 3.95 |
| 3 | 572 | 0.114 | .0315 | 338 | 5.32 |
| 4 | 580 | 0.141 | .012 | 343 | 5.29 |

Continued

| Run | Nozzle Die Temp. °F. | Resin Flow Rate (gm/min/orifice) | Air Slot Height (inches) | Air Velocity (ft/sec) | Air Rate lb/min/in² of Total Slot Area |
|---|---|---|---|---|---|
| 5 | 581 | 0.145 | .020 | 330 | 5.10 |
| 6 | 591 | 0.256 | .012 | 470 | 7.17 |
| 7 | 572 | 0.256 | .020 | 466 | 7.25 |
| 8 | 545 | 0.089 | .020 | 391 | 6.25 |
| 9 | 606 | 0.117 | .020 | 210 | 3.25 | o By comparing Runs 1 through 7, it is seen that at constant nozzle die temperature, the allowed air velocity increases as the polymer rate increases.
o By comparing Runs 8 with 1 and 2, 3 with 9, and 7 with 6, it is seen that the allowable air velocity decreases as the nozzle die temperature increases.

Similar behavior is observed for all $C_3$–$C_8$ polyolefin resins having an intrinsic viscosity of at least 1.4 that are appropriately thermally degraded to intrinsic viscosities of from about 0.6 to less than 1.4. The air velocity which causes fiber breakage is well below the sonic velocity of air at the nozzle die tip temperatures. The maximum fiber velocity as calculated from the fiber diameter and resin flow rate is well below the air velocity. The products consist of continuous fibers whose diameters usually range from about 8 to 50, preferably 8–30 microns depending on the nozzle die temperature, air flow rates, resin flow rates, and degree of thermal degradation imparted to the resin. The non-woven mat or web has a slightly harsh feel and individual fibers are readily seen with the eye or with a low-powered magnifier (7X). The webs, when collected 6 or more inches from the die, show low strength and high elongation.

It is therefore seen that for resin flow rates of from about 0.1 to about 5 grams per minute per orifice, the characteristics of the non-woven mat under appropriate thermal treatment conditions are largely determined by the gas (air) flow rates used in the melt-blowing process. When the air flow rates are generally low or subsonic (2.5 to 20 pounds per minute per square inch total gas slot area), the fibers in the non-woven mat are essentially continuous while at the high air flow rates or sonic velocities the fibers are non-continuous and in addition fine shot is produced.

Another factor determining the characteristics of the product mat is the distance of the take-up device from the openings 6 in the nozzle die head 3. When the collecting device is between 1 to 6 inches, there is considerable self-bonding of the fibers since they are still hot at the point of laydown so that they bond one to another upon contact. At distances of 6 inches there still occurs self-bonding, but the amount decreases with distance.

When the air flow rates are too low for a selected resin flow rate, large coarse fibers are formed. These fibers are generally entwined to form coarse, ropey bundles or "rope" in the mat resulting in a coarse, non-pliable, brittle mat structure. At low to moderate air flow rates appropriate for the selected resin flow rate, fine, continuous fibers (most preferably 8 to 30 microns in diameter) are produced and the mat is of a soft and pliable texture. The mats produced at these moderate air rates have a cardboard appearing rigidity when the fibers are collected at about 5 to 6 inches but have loose fiber whiskers on the more compact inner structure of the mat. If the fibers are collected nearer the die openings, the mats appear more rigid and with less loose fibers or whiskers. A fluffier mat is produced if the fibers are collected at over 5 to 6 inches.

At even higher air flow rates for the selected resin flow rate, fiber breakage occurs resulting in large objectionable shot in the mat. This type of shot is intermittent and may be as large as 1 millimeter in diameter and gives a rough, sandpapery feel to the mat. Upon calendering the mat, this type of shot appears as large translucent areas in the mat giving a coarsely speckled appearance to the calendered mat.

At even higher air flow rates for the selected resin flow rate (in the range from about 20 to about 100 pounds per minute per square inch of total air slot area), essentially all non-continuous and very fine fibers are produced with the formation of a very fine uniform type of shot. This shot is less than 0.1 millimeter in diameter and is not noticeable to the touch nor visually, but is detected after calendering whereupon the mat appears as a very smooth white mat with a highly uniform fine grained texture due to the presence of the very fine particles of shot. The mat produced at these very high air rates and at long die-to-collector distances has a very soft and pliable texture which appears like cotton batting, due to the very fine fibers (less than 5 microns).

The present invention will be further illustrated by the following specific examples which are given by way of illustration. In the examples, unless otherwise specified, the nozzle die used was a 4-inch row of 80 orifices for resin extrusion, each orifice having a .022 inch diameter and being .050 between centers. The air slots above and below the row of orifices had a nominal height of about 0.010 inch.

EXAMPLES 1–4

In these examples the conditions were as follows:

| | |
|---|---|
| Resin | 33.6 melt flow rate (1.54 intrinsic viscosity) polypropylene |
| Extruder Temperature | 590° F. |
| Die Temperature | 530°–545° F. |
| Air Temperature | 510°–540° F. |
| Resin | 7.1 gms/min (0.089 gms/min/orifice) |
| Collector Distance | 8 inches |
| Collector, rpm | 0.9 |

Air rate was varied with the results shown in Table II.

The resin used in these examples was a blend of base resin polypropylene having a low melt index which was extruded at extruder temperatures about 620° F. to produce the 33.6 melt flow rate polypropylene. By thereby thermally treating the polypropylene before introducing it to the extruder feeding the die, lower extruder and die temperatures could be used in the melt-blowing.

These Examples demonstrate the importance of proper air flow rate in obtaining mats with desirable characteristics. The optimum air flow rate will, of course, vary depending on other conditions.

TABLE II

EFFECT OF AIR RATE ON FIBER FORMATION

| Example No. | Air Rate lbs/min | lbs/min/in² slot | Mat Description |
| --- | --- | --- | --- |
| 1 | 0.289 | 3.62 | Coarse, brittle mat composed of large ropey fibers |
| 2 | 0.474 | 5.86 | Softer mat, finer fibers |
| 3 | 0.659 | 8.25 | Soft, pliable mat composed of fine, continuous fibers |
| 4 | 0.705 | 8.86 | Mat contains large "shot" particles. Mat rough and of poor appearance. |

TABLE III

MAT PRODUCTION AT VERY HIGH AIR RATE

| Example No. | Air Rate pounds/min | pounds/min/in² slot | Mat Description |
| --- | --- | --- | --- |
| 5 | 1.05 | 13.1 | Mat contains large shot, rough, poor appearance |
| 6 | 1.28 | 16.0 | Mat contains smaller shot, still poor |
| 7 | 1.51 | 18.85 | Still smaller shot, better appearance |
| 8 | 1.74 | 21.8 | Mat contains fine shot. Good appearance |
| 9 | 2.09 | 26.1 | Very fine shot unnoticeable to the touch. Mat extremely soft and pliable. Excellent appearance |

For example, with all conditions the same as in the above except at a resin flow rate which was 21.2 grams per minute (0.265 grams per minute per orifice), an air flow rate of 1.12 pounds per minute (14 pounds/min/in² slot) gave the best mat as compared to an air rate of 0.659 pounds/min. (8.25 pounds/min./in² slot) in Example 3. At this higher polymer rate, the fiber sizes were larger but still a good, uniform shot-free soft mat was obtained.

Moreover in an example using a die temperature of 590° F. instead of 530°–545° F. of Example 3, an air rate of 0.59 pounds/min. (7.36 pounds/min/in² slot) produced the best mat. It is generally true that a higher die temperature requires lower air flow rates for high quality mats.

EXAMPLES 5–9

The following Examples illustrate the mats that can be produced at very high air rates, where the size of the shot formed is so small as to be undetectable. The conditions were as follows:

| | |
| --- | --- |
| Resin | 33.6 melt flow rate (1.54 intrinsic viscosity) polypropylene |
| Extruder Temperature | 590° F |
| Die Temperature | 645° F. |
| Air Temperature | 580° F. |
| Resin Flow Rate | 18.7 gms/min. (0.234 gms/min./orifice) |
| Collector Distance | 8 inches |
| Collector, rpm | 1.33 |

Air rate was varied with the results shown in Table III.

EXAMPLES 10–13

The following Examples show that different base resins can be used for forming good quality mats by proper thermal treatment of the resin using elevated extruder and die temperatures prior to fiber formation. For Examples 10–12 the conditions were as follows:

| | |
| --- | --- |
| Resin | 0.6 melt flow rate (3.37 intrinsic viscosity) polypropylene |
| Air Temperature | 640° F. |
| Resin Flow Rate | 8.2 gms/min. (.102 gms/min./orifice) |
| Air Rate | 0.54 pounds/min. (6.75 pounds/min./in² slot) |
| Collector Distance | 6 inches |
| Collector, rpm | 1.0 |

For Example 13 the conditions were as follows:

| | |
| --- | --- |
| Resin | 3.0 melt flow rate (2.47 intrinsic viscosity) polypropylene |
| Air Temperature | 580° F. |
| Resin Flow Rate | 7.2 gms/min. (0.09 gms/min./orifice) |
| Air Rate | 0.786 pounds/min. (9.83 pounds/min./in² slot) |
| Collector Distance | 7 inches |
| Collector, rpm | 3.0 |

The extruder temperatures and die temperatures used are shown in Table IV.

TABLE IV

EFFECT OF THERMAL TREATMENT ON FIBER FORMATION

| Example No. | Extruder Temp. °F. | Die Temp. °F. | Mat Description |
| --- | --- | --- | --- |
| 10 | 660° | 650° | Very coarse mat, large ropey fibers |
| 11 | 670° | 650° | Good mat, fine fibers, no shot, soft and pliable |

TABLE IV — Continued

EFFECT OF THERMAL TREATMENT ON FIBER FORMATION

| Example No. | Extruder Temp. °F. | Die Temp. °F. | Mat Description |
| --- | --- | --- | --- |
| 12 | 680° | 650° | Appreciable shot in mat. |
| 13 | 600° | 740° | Soft, pliable, and shot-free mat. |

As seen in Examples 10–12, the extruder temperature is critical, holding all other conditions the same, in thermally treating this low melt flow resin so as to produce soft, shot-free mats. However, Example 13 illustrates that a lower extruder temperature but higher die temperature was used to form a good quality mat.

EXAMPLES 14–19

In the foregoing examples, the variables in the process are illustrated and emphasized; however, the following examples are set forth to illustrate the variety of mats which may be produced. The mats may be made in a wide variation of thickness, degrees of rigidity and general appearance. All the mats of the present invention have sufficient thickness, rigidity and strength to be self-supporting such that it may be removed from the take-up device as a self-bonded mat.

Mats may be produced which are tissue paper thin (0.0005–0.003 inch) and would drape over a pencil in the same manner. Thicker mats (0.05–0.5 inch) while still soft and pliable may have a more rigid appearance, e.g. that of thin cardboard. The thickness of the mat may be increased by slowing down the rate of removal of the mat from the take-up device or by multiple layers. The rate of removal may be controlled by the rpm of the drum while the multiple layers may be accomplished by multiple rotations of the drum or by using multiple die heads.

At the lower air rates, the mats have a more compact appearing core with loose, whisker-like fibers on either side of the more compact fibers. The compactness of the fibers in the mat is controlled largely by the distance of the take-up device from the die openings. At the high air rates, the mats have the appearance of cotton batting.

Exemplary mats are illustrated in the examples set forth in Table V which follows:

The mat from Example 14 was soft and pliable with a compact core and loose fibers on each surface. The mat had a rigidity or stiffness like thin cardboard. In contrast, the mat from Example 15 was produced at high air rates, the other conditions being very similar and was very soft, having the appearance of compacted cotton batting. The mat, due to its thickness, was fairly rigid.

The mat from Example 16 was approximately 0.0025 inches thick as taken from the pick-up device and when calendered had a translucent, slightly mottled, tissue paper appearance. The calendered mat was about 0.0009 inches thick. The mat from Example 17 was approximately 0.0028 inches before calendering. The calendered mat had a very fine grain, uniform, tissue paper appearance.

The mat from Example 18 illustrates that multiple layers of fibers may be melt blown to produce thicker mats. On the other hand, paper-like mats can be produced at very close distances from the die openings such as illustrated in Example 19.

EXAMPLES 20 and 21

For some applications it may be desirable to use other polyolefins than polypropylene in the form of the fine fiber mats. For example, polybutene-1 can give a much lower stiffness to the mat; poly-3-methylbutene-1, poly-4-methylpentene-1, poly-4-methylhexane-1 and poly-5-methylhexene-1 have much higher melting points than polypropylene.

It has been found that $C_3$ or greater polyolefins having an intrinsic viscosity of at least about 1.5 can be melt-blown by the process of the present invention to produce good mats provided the $C_3$ or greater polyolefins are appropriately thermally treated.

TABLE V

|  | 14 | 15 | 16 | 17 | 18 | 19 |
| --- | --- | --- | --- | --- | --- | --- |
| Polypropylene MFR | 33.6 | 33.6 | 27.7 | 27.7 | 33.6 |  |
| Extruder Temp., °F. | 602 | 601 | 612 | 590 | 603 | 580 |
| Die Temp., °F | 605 | 607 | 612 | 600 | 607 | 660 |
| Air Temp., °F. | 568 | 658 | 613 | 632 | 669 | 642 |
| Polymer Rate, gm/min. | 8.0 | 8.0 | 8.0 | 8.0 | 8.0 | 13.6 |
| Air Flow, No./min. | 0.569 | 2.33 | 0.513 | 1.75 | 2.33 | 2.77 |
| Screen Distance, in | 6 | 6 | 6 | 5 | 6 | 1⅛ |
| Speed, rpm | 0.12 | 0.12 | 3.7 | 3.7 | 1 | 7.3 |
| Rotations | 1 | 1 | 1 | 1 | 9 | 1 |
| Mat Characteristics |  |  |  |  |  |  |
| Fiber Size | 15–25μ | ~2μ | 8–12μ | ~2μ | ~2μ | ~2μ |
| Thickness | 0.09" | 0.3" |  |  |  |  |
| Basis wt. gm/m² | 425 | 425 | 16 | 16 | 450 | 52 |

To illustrate another $C_3$ to $C_8$ polyolefin other than polypropylene, poly-4-methylpentene-1 was successfully melt blown to produce a fine fiber mat (0.5 to 5 micron diameter). The conditions used in the melt blowing and the fiber characteristics are set forth in Table VI hereinafter.

Table VI

|  | 20 | 21 |
|---|---|---|
| Poly-4-methylpentene-1 |  |  |
| Intrinsic Viscosity | 1.82 | 1.82 |
| Extruder |  |  |
| Temp., °F. | 620 | 650 |
| Die |  |  |
| Temp., °F. | 537 | 570 |
| Air |  |  |
| Temp., °F. | 575 | 575 |
| Polymer |  |  |
| Rate, gm/min. | 13.6 | 13.6 |
| Air |  |  |
| Flow, No./min. | 4.86 | 4.46 |
| Screen |  |  |
| Distance, in. | 6 | ½ |
| Mat |  |  |
| Characteristics |  |  |
| Fiber Size | 2μ | 2μ |
| Intrinsic Viscosity | 1.23 | 0.88 |

EXAMPLES 23–26

The extent of thermal treatment necessary to thermally degrade a feed polypropylene resin having a starting melt flow rate of 33.6 (intrinsic viscosity of 1.54) to be extruded at a rate of 0.22 grams per minute per orifice from an extruder at a die temperature of about 600°–610° F. was determined by fixing the polymer flow rate and the nozzle die temperature and then increasing the extruder temperature until large shot (greater than 0.1 millimeters) was no longer produced yet short of causing fiber breakage. The data in Table VII were taken:

TABLE VII

| Example | 23 | 24 | 25 | 26 |
|---|---|---|---|---|
| Maximum Extruder Temp. °F. | 701 | 710 | 722 | 732 |
| Die Temperature, °F. | 610 | 601 | 601 | 602 |
| Air Temperature, °F. | 625 | 626 | 620 | 615 |
| Air Flow Rate, pounds/min./in² slot | 72.5 | 72.0 | 72.5 | 72.5 |
| Resin Flow Rate gm/min./hole | 0.22 | 0.22 | 0.22 | 0.22 |
| Melt Pressure, psig | 643 | 525 | 355 | 255 |
| Calculated $\mu_A$, poise | 115 | 94.1 | 63.6 | 45.7 |
| Web Properties | Shot | Still some shot | Fairly nice web | Fibers breaking |

The above data was taken using a 4-inch wide nozzle die head containing a row of 80 triangular shaped orifices which were 0.015 inch in height and 0.75 inch long, with air slots of 0.015 inch in height on each side of the nozzle orifices. The apparent viscosity existing in the nozzle orifices at a particular extruder temperature was calculated according to the following equation:

$$\mu_A = \mu D^4 \rho g_c \Delta P / 128 L W$$

where $\mu_A$ = apparent viscosity
$D$ = hole diameter (for non-circular holes = $4A/P$ where $A$ = area of opening, $P$ = wetted perimeter)
$\rho$ = melt density
$g_c$ = 32.2 lb ft/sec²/lb force
$\Delta P$ = pressure drop through hole
$L$ = length of holes
$W$ = rate of melt flow through hole From the foregoing measured and calculated data, it is seen that at a given resin flow rate, air flow rate, and nozzle die temperature, the extent of thermal treatment is very critical in order to produce an appropriate level of thermal degradation and appropriate viscosity in the nozzle die holes. Thus, for the die hole configurations used in Examples 23–26 and at the polymer flow rate, air flow rate, and nozzle die temperature there employed, an extruder maximum temperature of 710° F. was ineffective to reduce the viscosity in the die holes to a level preventing the formation of coarse shot, but at an extruder maximum temperature of 732° F., the viscosity in the die holes had dropped below 50 poise and the fibers produced were so weak that they could not be formed into a satisfactory web. However, a shot free web of fine fibers was produced at an extruder maximum temperature of 722° F., which produced an apparent viscosity in the nozzle die hose of 63.6 poise.

The particular extent of thermal treatment necessary to degrade a feed resin to the proper intrinsic and apparent viscosity for extrusion at a particular resin flow rate and die temperature will vary with the changes in the die configuration, starting resin intrinsic viscosity, or resin flow rate. The necessary air rate will vary with the acceptable apparent viscosity in the nozzle die orifices. This is illustrated in the following Examples 27–31.

EXAMPLES 27–31

In these examples, a 10-inch die with a row of 200 triangular shaped orifices having a height of 0.15 inch was employed. In Examples 28–31, the length of the orifices was 0.113 inch, whereas in Example 27, the length of the orifices was 0.375 inch. The intrinsic viscosity of the feed resin (polypropylene) was 1.54 in Examples 27, 28 and 30, was 2.47 in Example 29, and was 1.5 in Example 31.

The process conditions utilized in Examples 26–31 and the results thereby obtained are set out below in Table VIII.

TABLE VIII

| Example | 27 | 28 | 29 | 30 | 31 |
|---|---|---|---|---|---|
| Maximum Extruder Temp., °F. | 638 | 639 | 770 | 650 | 720 |
| Air Temperature, °F. | 631 | 630 | 660 | 700 | 707 |
| Die Tip Temperature, °F. | 615 | 597 | 625 | 610 | 640 |
| Air Flow Rate, pounds/min² slot | 76 | 33.5 | 35 | 82 | 46 |
| Polymer Resin Flow Rate gm/min/orifice | 0.5 | 0.5 | 0.6 | 1.0 | 1.9 |

TABLE VIII – Continued

| Example | 27 | 28 | 29 | 30 | 31 |
|---|---|---|---|---|---|
| Melt Pressure, psig | 275 | 175 | 170 | 290 | 260 |
| Calculated $\mu$, poise | 93 | 190 | 156 | 162 | 75 |

The higher die tip temperature of Example 27 compared to Example 28 produced a lower apparent viscosity of the resin in the orifice. In Example 27 the apparent viscosity was 93 poise, whereas the apparent viscosity in the nozzle orifice in Example 28 was 190 poise.

Comparison of Example 30 with Example 28 discloses that a greater overall extent of thermal treatment and higher air temperature was necessary for a doubled flow rate of the same starting resin to produce a satisfactory level of thermal degradation.

Similarly, a greater degree of thermal degradation, i.e., higher extruder temperature, was necessary for the higher intrinsic viscosity starting resin of Example 29 in order to produce a satisfactory level of thermal degradation.

The mats made by the process of the present invention are useful as filters, wiping cloths, thermal insulation, battery separator basestock, packaging materials, hydrocarbon absorption material, diaper liners, synthetic leather base, laminates, sound absorbing materials, padding, disposable clothing components, bags, shipping protection, synthetic paper and for electrical paper applications. The mats may be used as melt-blown or they may be pressed, calendered, cut impregnated, coated, laminated, or otherwise treated for particular end uses. In general, the mats made of the fibers in the range from 0.5 to 5 microns have greater strip tensile strength than the mats made from the fibers having 8 to 40 micron diameter fibers, such latter mats having generally greater tear resistances.

The term "self-bonded" as used herein means that the mats are coherent, integral structures capable of withstanding normal handling such as winding, unwinding, cutting, pressing, calendering, etc., without losing their essential mat-like character. In most mats produced according to the present invention, some thermal bonding occurs, usually directly dependent on the distance from the die head that the mat was formed.

The nature and object of the present invention having been described and illustrated and the best mode thereof now contemplated set forth, what we wish to claim as new and useful and secure by Letters Patent is:

1. In a process for producing a melt-blown non-woven mat wherein a fiber-forming thermoplastic polymer resin is extruded in molten form from orifices of a heated nozzle into a stream of hot inert gas which attenuates said molten resin into fibers that form a fiber stream, and said fibers are collected on a receiver in the path of said fiber stream to form said non-woven mat, the improvement which comprises:
subjecting a fiber-forming thermoplastic polymer resin having an initial intrinsic viscosity of at least 1.4 to degradation in the presence of a free radical source compound prior to extrusion from said nozzle orifices until said resin has both a reduced intrinsic viscosity of from about 0.6 to less than 1.4 and an apparent viscosity in said nozzle orifices of from about 50 to about 300 poise.

2. The process of claim 1 wherein said resin is subjected to thermal degradation at a temperature within the range from about 550° F. to about 900° F. for a period of time effective to cause said resin to have said reduced intrinsic viscosity and said apparent viscosity.

3. The process of claim 2 in which said thermoplastic polymer resin is subjected to said thermal degradation at least partially in an extruder feeding said resin into said nozzle.

4. The process of claim 3 wherein said resin is thermally degraded in an extruder for from about 1 to about 10 minutes effective to cause said resin to have said reduced intrinsic viscosity and said apparent viscosity.

5. The process of claim 1 wherein said free radical source compound is selected from organic peroxides, thiyl compounds, and organo-tin compounds.

6. The process of claim 1 wherein said thermoplastic polymer resin is selected from $C_3$–$C_8$ polyolefins and mixtures thereof which have an initial intrinsic viscosity of at least 1.4.

7. In a process for producing a melt-blown non-woven mat wherein a fiber-forming thermoplastic polymer resin is extruded in molten form from orifices of a heated nozzle into a stream of hot inert gas which attenuates said molten resin into fibers that form a fiber stream, and said fibers are collected on a receiver in the path of said fiber stream to form said non-woven mat,
the improvement of producing said mat at high resin flow rates, which comprises:
extruding from said nozzle orifices, at a resin flow rate of from about at least 0.1 to about 5 grams per minute per orifice, a fiber-forming thermoplastic polymer resin degraded to have both an intrinsic viscosity of from about 0.6 to less than 1.4 and an apparent viscosity in said nozzle orifices of from about 50 to about 300 poise.

8. The process of claim 7 wherein said apparent viscosity is from about 100 to about 300 poise.

9. The process of claim 7 wherein said resin is subjected to said degradation at least partially in an extruder feeding said resin to said nozzle.

10. The process of claim 9 wherein said resin is subjected to a temperature within the range from about 550° F. to about 900° F. for a period of time from about 1 to about 10 minutes effective to cause said degradation of said resin until said resin has said apparent viscosity and said intrinsic viscosity.

11. The process of claim 7 wherein said resin is selected from $C_3$–$C_8$ polyolefins and mixtures thereof.

12. In a process for producing a melt-blown non-woven mat wherein a fiber-forming thermoplastic polymer resin in molten form is forced by an extruder through a row of orifices in a heated nozzle into a stream of hot inert gas which is issued from outlets adjacent to said row of orifices so as to attenuate said molten resin into fibers which form a fiber stream, and said fibers are collected on a receiver in the path of said fiber stream to form said non-woven mat,
the improvement of increasing the production of said non-woven mats while preventing the inclusion of coarse shot in such mats, by the method which comprises in combination:

subjecting a fiber-forming thermoplastic polymer resin having an initial intrinsic viscosity of at least 1.4 to thermal degradation, at least partially in an extruder, for a sufficient time at a temperature within the range of from about 550° F. to about 900° F. effective to cause said resin to have both a reduced intrinsic viscosity of from about 0.6 to less than 1.4 and an apparent viscosity in said nozzle orifices of from about 50 to about 300 poise, said heated nozzle having a temperature within the range of from about 500° F. to about 900° F., operating said extruder so as to force said degraded resin in molten form from said row of nozzle orifices at a resin flow rate of from about 0.1 to about 5 grams per minute per nozzle orifices, and issuing said hot, inert gas at a temperature from about 500 F. to about 900° F. from said outlets at a gas flow rate of from about 2.5 to about 20 pounds per minute per square inch of outlet area, effective to attenuate said extruded degraded resin into fibers having diameters of from about 8 to about 400 microns, said resin flow rate being selected from rates in said resin flow rate range which are not below a minimum rate below which, for a chosen combination of gas flow rate and degraded resin apparent viscosity, coarse shot is formed, said minimum resin flow rate increasing in its aforesaid range as said gas flow rate is increased in its range or as said degraded resin has a decreased apparent viscosity in its range, or both.

13. The method of claim 12 in which said resin is selected from $C_3$ to $C_8$ polyolefins and mixtures thereof.

14. The method of claim 13 in which said resin flow rate is at least 1.0 gram per minute per orifice and said apparent viscosity is from about 100 to about 300 poise.

15. In a process for producing a melt-blown nonwoven mat wherein a fiber-forming thermoplastic polymer resin in molten form is forced by an extruder through a row of orifices in a heated nozzle into a stream of hot inert gas which is issued from outlets adjacent to said row of orifices so as to attenuate said molten resin into fibers which form a fiber stream, and said fibers are collected on a receiver in the path of said fiber stream to form said non-woven mat, the improvement of increasing the production of said non-woven mats while preventing the inclusion of coarse shot in such mats, by the method which comprises in combination:

subjecting a fiber-forming thermoplastic polymer resin having an initial intrinsic viscosity of at least 1.4 to thermal degradation, at least partially in an extruder, for a sufficient time at a temperature within the range of from about 550° F. to about 900° F. effective to cause said resin to have both a reduced intrinsic viscosity of from about 0.6 to less than 1.4 and an apparent viscosity in said nozzle orifices of from about 50 to about 300 poise, said heated nozzle having a temperature within the range of from about 500° F. to about 900° F., operating said extruder so as to force said degraded resin in molten form from said row of nozzle orifices at a resin flow rate of from about 0.1 to about 5 grams per minute per nozzle orifice, and issuing said hot, inert gas at a temperature from about 500° F. to about 900° F. from said outlets at a gas flow rate of from greater than 20 to about 100 pounds per minute per square inch of outlet area effective to attenuate said extruded degraded resin into fibers having a diameter of from about 0.5 to about 5 microns, said resin flow rate being selected from rates in said resin flow rate range which do not exceed a maximum rate above which, for a chosen combination of gas flow rate and degraded resin apparent viscosity, coarse shot is formed, said maximum resin flow rate decreasing in its aforesaid range as said gas flow rate is decreased in its range or as said degraded resin has an increased apparent viscosity in its range, or both.

16. The method of claim 15 in which said resin is selected from $C_3$ to $C_8$ polyolefins and mixtures thereof.

17. The method of claim 16 in which said resin flow rate is at least 1.0 per minute per orifice and said apparent viscosity is from about 100 to about 300 poise.

18. In a process for producing a melt-blown nonwoven mat wherein a fiber-forming thermoplastic polymer resin in molten form is forced by an extruder through a row of orifices in a heated nozzle into a stream of hot inert gas which is issued from outlets adjacent to said row of orifices so as to attenuate said molten resin into fibers which form a fiber stream, and said fibers are collected on a receiver in the path of said fiber stream to form said non-woven mat, the improvement of increasing the production of said non-woven mats while preventing the inclusion of coarse shot in such mats, by the method which comprises in combination:

subjecting a fiber-forming thermoplastic polymer resin having an initial intrinsic viscosity of at least 1.4 to thermal degradation, at least partially in an extruder, for a sufficient time at a temperature within the range of from about 550° F. to about 900° F., effective to cause said resin to have both a reduced intrinsic viscosity of from about 0.6 to less than 1.4 and an apparent viscosity in said nozzle orifices of from about 50 to about 300 poise, said heated nozzle having a temperature within the range of from about 500° F. to about 900° F., operating said extruder so as to force said degraded resin in molten form from said row of nozzle orifices at a resin flow rate of from about 0.1 to about 5 grams per minute per nozzle orifices, and issuing said hot, inert gas at a temperature from about 500° F. to about 900° F. from said outlets at a gas flow rate of from about 2.5 to about 20 pounds per minute per square inch of outlet area, effective to attenuate said extruded degraded resin into fibers having diameters of from about 8 to about 400 microns, said gas flow rate being selected from rates in said gas flow rate range that do not exceed a maximum rate above which, for a chosen combination of resin flow rate and degraded resin apparent viscosity, coarse shot is formed, said maximum gas flow rate decreasing in its aforesaid range as said resin flow rate decreases in its range or said degraded resin has a decreased apparent viscosity in its range, or both.

19. The method of claim 18 in which said resin is selected from $C_3$ to $C_8$ polyolefins and mixtures thereof.

20. The method of claim 19 in which said resin flow rate is at least 1.0 gram per minute per orifice and said apparent viscosity is from about 100 to about 300 poise.

21. In a process for producing a melt-blown non-woven mat wherein a fiber-forming thermoplastic polymer resin in molten form is forced by an extruder through a row of orifices in a heated nozzle into a stream of hot inert gas which is issued from outlets adjacent to said row of orifices so as to attenuate said molten resin into fibers which form a fiber stream, and said fibers are collected on a receiver in the path of said fiber stream to form said non-woven mat, the improvement of increasing the production of said non-woven mats while preventing the inclusion of coarse shot in such mats, by the method which comprises in combination.

subjecting a fiber-forming thermoplastic polymer resin having an initial intrinsic viscosity of at least 1.4 to thermal degradation, at least partially in an extruder, for a sufficient time at a temperature within the range of from about 550° F. to about 900° F., effective to cause said resin to have both a reduced intrinsic viscosity of from about 0.6 to less than 1.4 and an apparent viscosity in said nozzle orifices of from about 50 to about 300 poise, said heated nozzle having a temperature within the range of from about 500° F. to about 900° F., operating said extruder so as to force said degraded resin in molten form from said row of nozzle orifices at a resin flow rate of from about 0.1 to about 5 grams per minute per nozzle orifice, and issuing said hot, inert gas at a temperature from about 500° F. to about 900° F. from said outlets at a gas flow rate of from greater than 20 to about 100 pounds per minute per square inch of outlet area effective to attenuate said extruded degraded resin into fibers having a diameter of from about 0.5 to about 5 microns, said gas flow rate being selected from rates in said gas flow rate range which are not below a minimum rate below which, for a chosen combination of resin flow rate and degraded apparent viscosity, coarse shot is formed, said minimum gas flow rate increasing in its aforesaid range as said resin flow rate increases in its range or said degraded resin has an increased apparent viscosity in its range, or both.

22. The method of claim 21 in which said resin is selected from $C_3$ to $C_8$ polyolefins and mixtures thereof.

23. The method of claim 22 in which said resin flow rate is at least 1.0 gram per minute per orifice and said apparent viscosity is from about 100 to about 300 poise.

24. In a process for producing a melt-blown non-woven mat wherein a fiber-forming thermoplastic polymer resin in molten form is forced by an extruder through a row of orifices in a heated nozzle into a stream of hot inert gas which is issued from outlets adjacent said row of orifices so as to attenuate said molten resin into fibers which form a fiber stream, and said fibers are collected on a receiver in the path of said fiber stream to form said non-woven mat, the improvement of increasing the production of said non-woven mats while preventing the inclusion of coarse shot in such mats, by the method which comprises in combination:

subjecting a fiber-forming thermoplastic polymer resin having an initial intrinsic viscosity of at least 1.4 to thermal degradation, at least partially in an extruder, for a sufficient time at a temperature within the range of from about 550° F. to about 900° F., effective to cause said resin to have both a reduced intrinsic viscosity of from about 0.6 to less than 1.4 and an apparent viscosity in said nozzle orifices of from about 50 to about 300 poise, said heated nozzle having a temperature within the range of from about 500° F. to about 900° F., operating said extruder so as to force said degraded resin in molten form from said row of nozzle orifices at a resin flow rate of from about 0.1 to about 5 grams per minute per nozzle orifices, and issuing said hot, inert gas at a temperature from about 500° F. to about 900° F. from said outlets at a gas flow rate of from about 2.5 to about 20 pounds per minute per square inch of outlet area, effective to attenuate said extruded degraded resin into fibers having diameters of from about 8 to about 400 microns, said resin being degraded to a selected apparent viscosity in said range of apparent viscosities that are not below a minimum apparent viscosity below which, for a chosen combination of resin flow rate and gas flow rate, coarse shot is formed, said minimum apparent viscosity increasing as said gas flow rate is increased in its range or as said resin flow rate is decreased in its range, or both.

25. The method of claim 24 in which said resin is selected from $C_3$ to $C_8$ polyolefins and mixtures thereof.

26. The method of claim 25 in which said resin flow rate is at least 1.0 gram per minute per orifice and said apparent viscosity is from about 100 to about 300 poise.

27. In a process for producing a melt-blown non-woven mat wherein a fiber-forming thermoplastic polymer resin in molten form is forced by an extruder through a row of orifices in a heated nozzle into a stream of hot inert gas which is issued from outlets adjacent to said row of orifices so as to attenuate said molten resin into fibers which form a fiber stream, and said fibers are collected on a receiver in the path of said fiber stream to form said non-woven mat, the improvement of increasing the production of said non-woven mats while preventing the inclusion of coarse shot in such mats, by the method which comprises in combination:

subjecting a fiber-forming thermoplastic polymer resin having an initial intrinsic viscosity of at least 1.4 to thermal degradation, at least partially in an extruder, for a sufficient time at a temperature within the range of from about 550° F. to about 900° F. effective to cause said resin to have both a reduced intrinsic viscosity of from about 0.6 to less than 1.4 and an apparent viscosity in said nozzle orifices of from about 50 to about 300 poise, said heated nozzle having a temperature within the range of from about 500° F. to about 900° F., operating said extruder so as to force said degraded resin in molten form from said row of nozzle orifices at a resin flow rate of from about 0.1 to about 5 grams per minute per nozzle orifice, and issuing said hot, inert gas at a temperature from about 500° F. to about 900° F. from said outlets at a gas flow rate of from greater than 20 to about 100 pounds per minute per square inch of outlet area effective to attenuate said extruded degraded resin into fibers having a diameter of from about 0.5 to about 5 microns, said resin being degraded to a selected apparent viscosity in said range of apparent viscosities that does not exceed a maximum apparent viscosity above which, for a chosen combination of resin flow rate and gas flow rate, coarse shot is formed, said maximum apparent viscosity decreasing as said gas flow rate is decreased in its range or as said resin flow rate is increased in its range, or both.

28. The method of claim 27 in which said resin is selected from $C_3$ to $C_8$ polyolefins and mixtures thereof.

29. The method of claim 28 in which said resin flow rate is at least 1.0 gram per minute per orifice and said apparent viscosity is from about 100 to about 300 poise.

30. A melt-blown non-woven mat produced by the process of claim 1.

31. A melt-blown non-woven mat produced by the method of claim 7.

32. A melt-blown non-woven mat produced by the method of claim 12.

33. A melt-blown non-woven mat produced by the method of claim 15.

34. A melt-blown non-woven mat produced by the method of claim 18.

35. A melt-blown non-woven mat produced by the method of claim 21.

36. A melt-blown non-woven mat produced by the method of claim 24.

37. A melt-blown non-woven mat produced by the method of claim 27.

* * * * *

UNITED STATES PATENT OFFICE
CERTIFICATE OF CORRECTION

Patent No. 3,849,241  Dated Nov. 19, 1974

Inventor(s) Robert R. Buntin, James P. Keller, John W. Harding

It is certified that error appears in the above-identified patent and that said Letters Patent are hereby corrected as shown below:

The following changes should be made to correct the spelling of the name of one of the inventors, Robert R. Buntin:

In the masthead, "Butin et al" should read "Buntin et al".

At "[75] Inventors:", "Robert R. Butin" should read "Robert R. Buntin".

Signed and Sealed this

Twenty-first Day of September 1976

[SEAL]

Attest:

RUTH C. MASON
*Attesting Officer*

C. MARSHALL DANN
*Commissioner of Patents and Trademarks*